No. 833,737. PATENTED OCT. 23, 1906.
R. M. FRANKLIN.
TRAP FOR CRUSTACEA.
APPLICATION FILED FEB. 7, 1905.
2 SHEETS—SHEET 1.
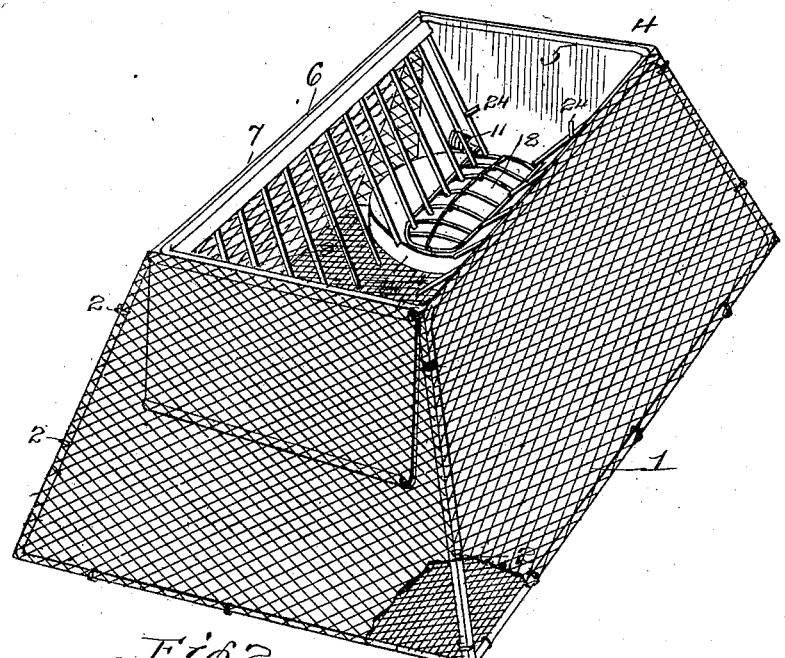
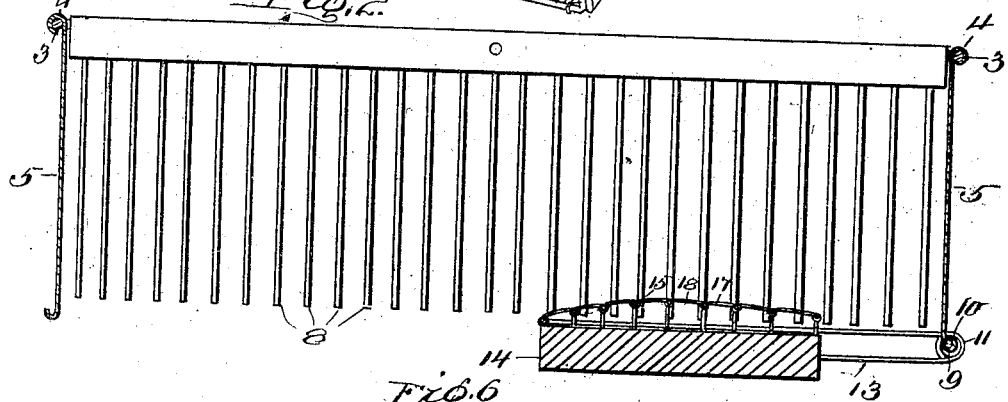
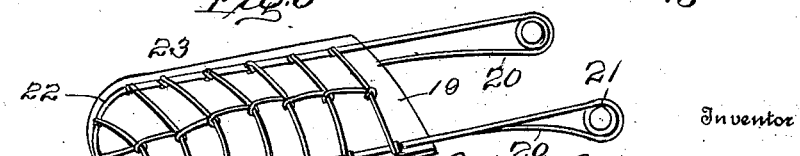
Witnesses
Inventor
Robert M. Franklin,
By Mason, Fenwick & Lawrence
his Attorneys No. 833,737. PATENTED OCT. 23, 1906.
R. M. FRANKLIN.
TRAP FOR CRUSTACEA.
APPLICATION FILED FEB. 7, 1905.
2 SHEETS—SHEET 2.
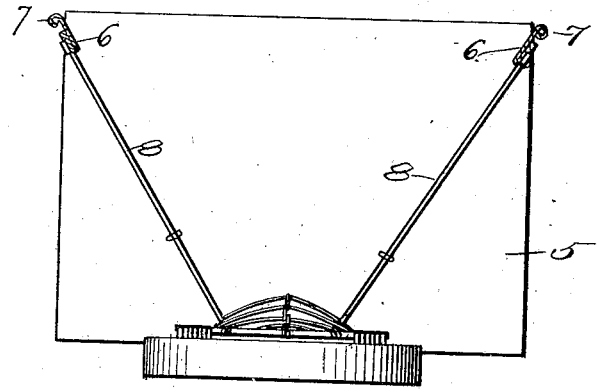
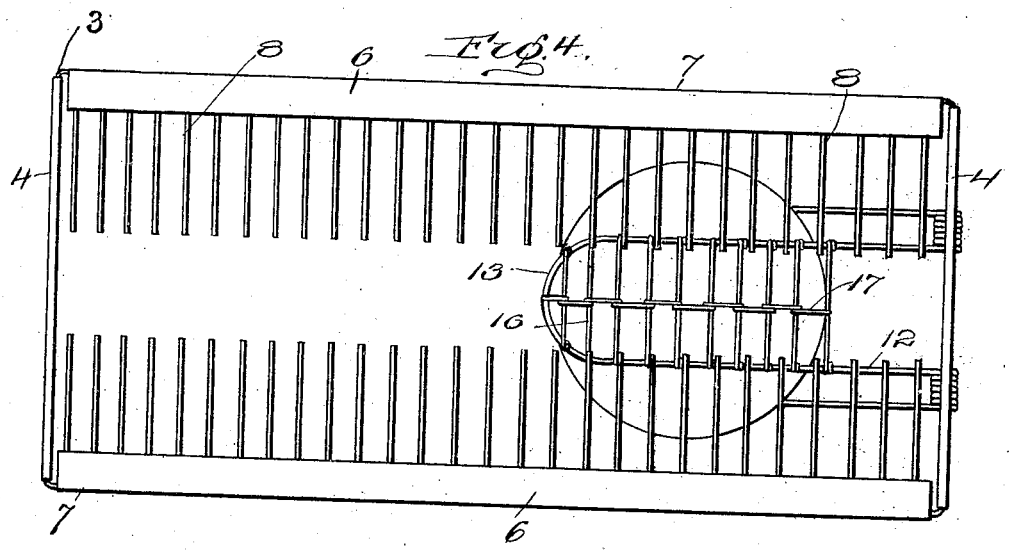
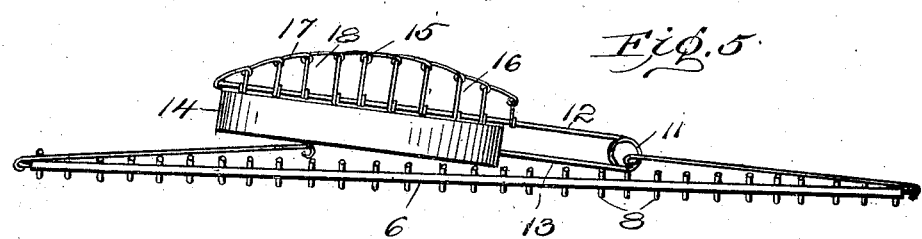

UNITED STATES PATENT OFFICE.

ROBERT M. FRANKLIN, OF GALVESTON, TEXAS.

TRAP FOR CRUSTACEA.

No. 833,737.　　　Specification of Letters Patent.　　　Patented Oct. 23, 1906.

Application filed February 7, 1905. Serial No. 244,611.

*To all whom it may concern:*

Be it known that I, ROBERT M. FRANKLIN, a citizen of the United States, residing at Galveston, in the county of Galveston and State of Texas, have invented certain new and useful Improvements in Traps for Crustacea; and I do hereby declare the following to be a full, clear, and exact description of the invention, such as will enable others skilled in the art to which it appertains to make and use the same.

My invention relates to new and useful improvements in traps especially adapted for catching crabs, lobsters, and other crustacea.

The object of the invention is to provide a collapsible inlet, preferably in the form of a rectangular hopper, which can be readily placed upon a box or other suitable receptacle and which has means for allowing crustacea to enter the trap, but which will prevent them from passing outward through the inlet.

A further object is to provide a bait-holder of novel construction adapted to be supported within the inlet and which is arranged to move into the trap when contacted by a crab or lobster, thereby serving to entice it through the inlet and into the trap.

Another object is to provide a bait-holder which will automatically assume a position within the inlet when the same is not contacted by a body entering the cage.

A further object is to provide a trap which can be quickly collapsed into a compact bundle which occupies a small compass and can be conveniently carried or stored and which by reason of its pyramidal form may be easily held in place when set in current and upon the bed of a body of water.

With the above and other objects in view the invention consists in certain novel constructions, combinations, and arrangements of parts, as will be hereinafter fully described and claimed.

In the accompanying drawings, Figure 1 is a perspective view of a trap constructed in accordance with my invention and provided with my improved inlet. Fig. 2 is a central vertical longitudinal section through the inlet and the bait-holder. Fig. 3 is a central vertical transverse section through the inlet. Fig. 4 is a top plan view thereof. Fig. 5 is a side elevation of the inlet of the trap collapsed, and Fig. 6 is a perspective view of a modified form of bait-holder.

Referring to the figures by numerals of reference, 1 is a receptacle which constitutes the body of the trap and is preferably in the form of a frustum of a pyramid and consists of side and end panels formed of netting, which are detachably secured along their meeting edges in any suitable manner, as by means of wire loops 2. These panels are hinged to the edges of the bottom panel, so that the body when set up is closed on all sides except the top by netting. This netting is formed of material which will not corrode when subjected to the action of water.

Arranged within the open face of the body is a guard of novel construction. This guard consists of a preferably rectangular frame 3, formed of a wire or rod bent into proper form, and the end portions of this frame are inclosed by beads 4 along one edge of end plates 5. These plates are equal in width to the width of the open face of the body and are adapted to be inserted thereinto. Strips 6 are arranged longitudinally upon the sides of frame 3 and are connected thereto by beads 7, formed integral therewith. By mounting each strip 6 in this manner the same is free to swing upon the frame. Extending from each of the strips is a series of parallel prongs 8, which are free at one end, and these series of prongs are adapted to converge to form a hopper-like inlet. One of the end plates 5 has a bead 9 formed on its lower edge, and within this bead is arranged a pivot-rod 10, on which are rotatably mounted coils 11, formed integral with a wire 12, formed of spring metal. The central portion of this wire is bent in the form of a loop 13, while the end portions thereof overlap and are preferably parallel with the sides of the loop and are secured to a float 14, formed of wood or any suitable buoyant device. The loop 13 bears normally upon the float and has an inverted basket-like structure 15 arranged therein. This structure consists of a series of transversely-extending arched wires 16, connected by a centrally-disposed bracing-wire 17, formed with a multiplicity of eyes 18, each of which engages one of the wires 16.

By forming the inlet-guard and bait-holder in the manner herein described the same can be readily collapsed in a compact bundle, as shown in Fig. 5. This is done by swinging the prongs 8 inward into the same plane and then folding the end plates 5 thereover, as shown in Fig. 3. When it is desired to set up the trap, the prongs 8 and the end plates 5 are turned downward to form a hopper-like structure, which is inserted into the inlet of the body 1. The float 14 and the bait-holder are thus positioned within the body. It is obvious that when the trap is submerged the float 14 will press the bracket of the bait-holder against the ends of the prongs 8, and if suitable bait has previously been placed upon the float and clamped thereon by said basket the same will be held in position within the inlet and between the prongs, where it can be easily reached by a crab or lobster. When a crustacean nibbles at the bait, the pressure exerted upon it and the float will cause the bait to swing downward into the water, thereby enticing the crab or lobster through the narrow rectangular inlet-opening formed between the ends of the prongs 8, and it is obvious that after it passes into the body 1 through this opening it cannot leave it through the same opening. Moreover, the float 14 will return the bait to its normal position within the inlet-opening, where it can be used for catching other crustacea. By employing a bait-holder such as herein described I can economize bait, as it is firmly held upon the float in such a manner as to prevent it from being carried off; but I do not confine myself to this method of baiting, as it is obvious that this trap can be operated by securing the bait at any point in the trap and beneath the inlet. It will of course be understood that in order to prevent movement of the prongs 8 after they have been adjusted to proper position it will be necessary to provide some form of fastening means. I preferably tie the end prongs of the series to the end plates 5 by means of a strong cord 24 or a wire or other suitable device.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having now described my invention, what I claim as new, and desire to secure by Letters Patent, is—

1. The combination with a trap-body having an inlet, of a guard attachment within the inlet comprising an inclined series of prongs forming a hopper-like inlet and a bait-holder normally contacting with the ends of the prongs and within the trap.

2. A device of the character described, comprising a trap-body having an inlet and a collapsible guard attachment within the inlet comprising a frame, oppositely-disposed series of prongs hinged upon the frame, an end plate hinged to said frame and a bait-holder connected to said plate and normally supported within the trap and upon the end of the prongs.

3. A device of the character described, comprising a trap-body having an inlet and a collapsible guard attachment within the inlet comprising a frame, oppositely-disposed series of prongs hinged upon the frame, end plates movably mounted on the frame, and a movable bait-holder connected to one of the plates and normally contacting with the ends of the prongs.

4. In a device of the character described, the combination with a trap-body having an inlet in the top thereof; of a guard attachment mounted within said inlet and comprising converging series of prongs forming a hopper-like inlet and a buoyant bait-holder within the body and normally contacting with the ends of the prongs.

5. A device of the character described, comprising a trap-body having an inlet in the top thereof, a guard attachment within the inlet consisting of converging movable series of prongs forming a hopper-like inlet, and a buoyant bait-holder mounted within the trap-body and normally contacting with the ends of the prongs.

6. In a device of the character described, the combination with a trap-body having a rectangular inlet in the top thereof, of a rectangular guard attachment within the inlet and consisting of a rectangular frame, oppositely-disposed series of prongs movably mounted upon the frame, oppositely-disposed plates mounted on the frame and means for securing said prongs against movement.

7. In a device of the character described, the combination with a trap-body having an inlet, of a guard attachment within the inlet comprising a frame, oppositely-disposed series of prongs movably mounted upon the frame, end plates movably connected to the frame, and means for securing the series of prongs to the end plates to prevent movement thereof.

8. In a device of the character described, the combination with a trap-body having an inlet, of a guard attachment within the inlet comprising a frame, oppositely-disposed series of prongs movably mounted upon the frame, end plates movably connected to the frame, means for securing the series of prongs to the end plates to prevent movement thereof, and a bait-holder within the trap-body and normally contacting with the prongs.

9. In a device of the character described, the combination with a trap-body having an inlet in the top thereof; of a guard attachment within the inlet and comprising a frame, oppositely-disposed series of prongs movably mounted upon the frame, end plates movably connected to the frame, means for securing the prongs against movement, and a buoyant bait-holder within the trap-body and movably connected to one of the end plates.

10. In a device of the character described, the combination with a trap-body having an inlet in the top thereof; of a guard attachment within the inlet and comprising a frame, oppositely-disposed series of prongs movably mounted on the frame, end plates movably secured to the frame, means for fastening the series of prongs to the end plates to prevent movement thereof, a float secured to one of the end plates, and means for clamping bait upon the float.

11. A guard attachment for traps comprising a frame, oppositely-disposed series of prongs movably mounted upon the frame, end plates movably connected to the frame, and a bait-holder movably connected to one of the end plates, said holder comprising a base portion and a spring bait-clamping device.

12. A guard attachment for traps comprising a frame, oppositely-disposed prongs extending from the frame and movably connected thereto, end plates hung upon the frame, a float movably connected to an end plate, and a bait-clamping device secured to and normally bearing upon the float.

13. A guard attachment for traps comprising a frame, oppositely-disposed series of prongs hinged upon the frame, end plates movably mounted on the frame, means for securing the series of prongs to the end plates, spring-arms movably connected to one of the end plates, and a bait-holder connected to the arms and comprising a base and a bait-clamping device normally contacting with the base.

14. A device of the character described comprising a collapsible trap-body having an inlet, a guard attachment within the inlet comprising a frame, oppositely-disposed series of prongs hinged upon the frame, end plates movably connected to the frame, and means for securing the series of prongs to the end plates, and a bait-holder within the body and movably connected to one of the end plates, and means for holding the bait-holder normally in contact with the prongs.

15. A collapsible attachment for traps comprising a frame, oppositely-disposed series of prongs hinged upon the frame, end plates hinged upon the frame, means for securing the prongs to the end plates, a bait-holder movably connected to one of the end plates, and means for holding the bait-holder normally in contact with the adjoining prongs.

16. A removable inlet for traps, comprising a frame, oppositely-disposed pivoted prong-frames carried by the trap-frame, end plates connected with the end prongs of the prong-frames for holding the said frames with respect to each other and a bait-holding means arranged inside the prong-frames and opposite the free ends of the prongs.

17. A removable inlet for traps, comprising a frame, panels pivoted to the opposite sides thereof, prongs projecting from said panels the free ends of the prongs approaching each other and forming the entrance to the trap, end panels also secured to the end prongs of the panels for holding the pronged panels in their adjusted positions.

In testimony whereof I affix my signature in presence of two witnesses.

ROBERT M. FRANKLIN.

Witnesses:
J. C. LEAGUE,
C. G. WELLS.